United States Patent [19]

Hughes et al.

[11] Patent Number: 5,662,161

[45] Date of Patent: Sep. 2, 1997

[54] BREATHING GAS COOLING AND HEATING DEVICE

[75] Inventors: Robert Hughes, Lynn Haven; Billy Courson, Panama City; Joseph Rudolph, Panama City Beach, all of Fla.

[73] Assignee: The United States of America as represented by the Secretary of the Navy, Washington, D.C.

[21] Appl. No.: 513,493

[22] Filed: Aug. 10, 1995

[51] Int. Cl.$^6$ .................................................. F28D 17/00
[52] U.S. Cl. ................. 165/10; 165/104.17; 165/104.14; 128/204.17; 128/201.13
[58] Field of Search ..................... 165/10, 104.17, 165/159, 104.14; 128/204.17, 204.15, 201.13

[56] References Cited

U.S. PATENT DOCUMENTS

| | | | |
|---|---|---|---|
| 3,140,590 | 7/1964 | Gleockler | 128/204.15 X |
| 3,229,681 | 1/1966 | Gluckstein | 128/201.13 X |
| 4,098,588 | 7/1978 | Buswell et al. | 165/159 X |
| 4,142,576 | 3/1979 | Perry et al. | 165/104.14 X |
| 4,188,947 | 2/1980 | Pasternack | 128/204.15 X |
| 4,270,523 | 6/1981 | van Heel | 165/10 X |
| 4,287,942 | 9/1981 | Whitman | 165/10 X |
| 4,341,262 | 7/1982 | Alspaugh | 165/10 X |
| 4,523,589 | 6/1985 | Krauser | 128/204.17 X |
| 4,609,036 | 9/1986 | Schrader | 165/10 |
| 4,662,352 | 5/1987 | Aviles, Jr. | 128/204.17 X |
| 4,722,829 | 2/1988 | Giter | 165/159 X |
| 5,027,891 | 7/1991 | Fulford et al. | 165/104.14 |
| 5,318,101 | 6/1994 | Kim | 165/10 |
| 5,377,670 | 1/1995 | Smith | 128/204.17 |

FOREIGN PATENT DOCUMENTS 1111766  9/1984  U.S.S.R. .................. 128/204.15

*Primary Examiner*—John Rivell
*Assistant Examiner*—Christopher Atkinson
*Attorney, Agent, or Firm*—Harvey A. Gilbert; William C. Townsend

[57] ABSTRACT

A breathing gas cooling and heating device. Warm breathing gas enters the unit which consists of a heat exchanger mounted in an insulated shell and runs through the heat exchanger tubes. These tubes are in intimate thermal contact with micro-encapsulated phase change materials. The micro-encapsulated phase change material changes phase from solid to liquid, thereby absorbing heat at the temperature of the phase change material, and thereby cooling the gas flowing through the heat exchanger. In situations where heating of the breathing gas is desired, the gas stream absorbs heat from the phase change material. The unit is rechargeable for chilling applications after usage by placing the device in an ambient environment less than the temperature of the phase change of the material or by replacing the phase change material. It is rechargeable for heating applications by warming the device to a temperature above that of the phase change material. The unit circumvents the need for ice, the most commonly available chilling medium, in situations where ice or other cooling is not available. Additionally, the unit can be used by filling it with an ice water slurry for fire fighting applications where ice is readily available. The gas then exits the device in a chilled state. The device is designed to work in conjunction with numerous existing breathing apparatus by virtue of the in-line installation capability to existing systems.

15 Claims, 1 Drawing Sheet

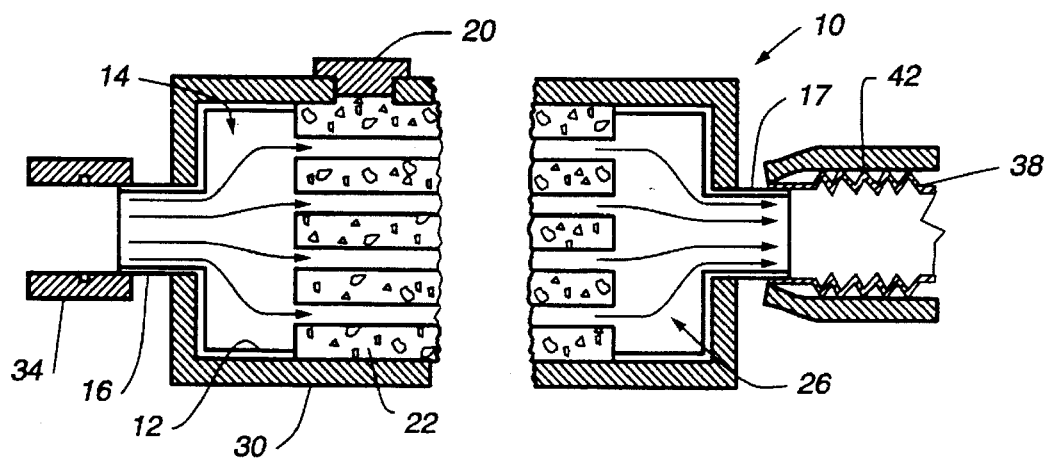
FIG. 1
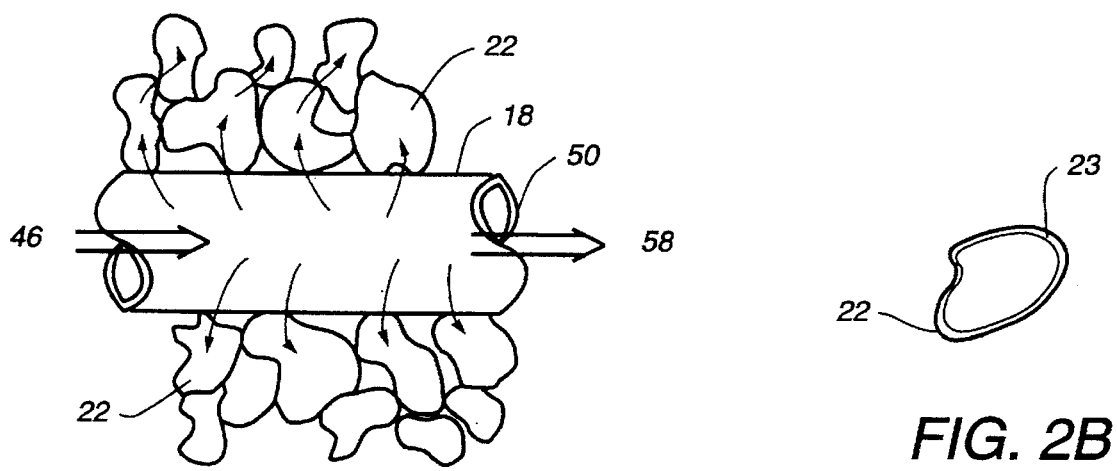
FIG. 2A
FIG. 2B
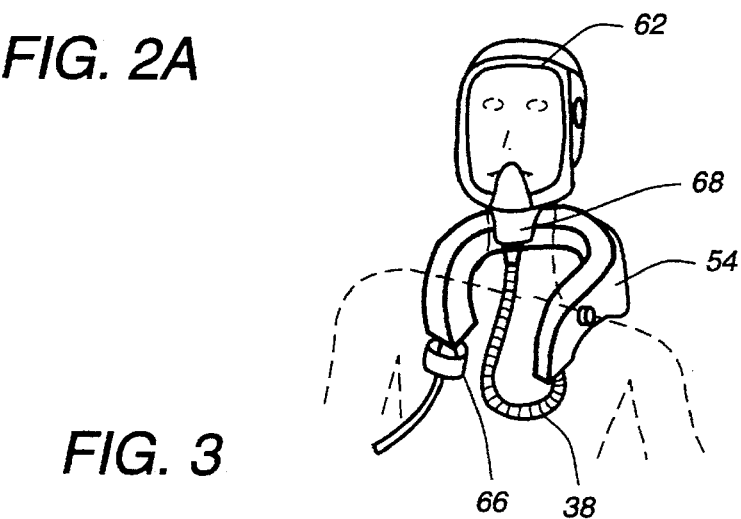
FIG. 3

BREATHING GAS COOLING AND HEATING DEVICE

INTRODUCTION

The present invention relates to breathing gas heating and cooling and, in particular, to a heat exchanger apparatus employing phase change material.

BACKGROUND OF THE INVENTION

The invention relates to the field of human survivability in elevated temperature situations such as fire-fighting or chemical warfare situations involving contamination suits in elevated temperatures. It is also useful for reduced temperature operation such as in the polar regions or during underwater diving operations where heating of the breathing gas is necessary.

Existing applications of self-contained breathing apparatus gas circuits, either closed circuit or open circuit, suffer from deficiencies in the thermal aspects of their operation. In a fire, heat gain from radiation and convection in the breathing gas circuit can push inhalation temperatures to critical temperatures (above 120 degrees for wet gases and 180 degrees for dry gases) thereby endangering the life of the fire fighter. Additionally, closed circuit systems which use a chemical scrubbing canister suffer from high heat gain from the canister alone. In bulky chemical warfare suits, although inhalation gas temperatures are not life threatening, they cause psychological stress, particularly claustrophobia. For reduced temperature operations such as in underwater diving, either hot water is pumped to a heat exchanger to warm the breathing gas, or the diver must suffer with the existing breathing gas temperature until it becomes unbearable.

At the current time, design of breathing gas circuits for use in elevated temperatures consist of simple insulation schemes in an attempt to minimize heat gains. Safe operation relies on the premise that fire fighters will exit the fire due to heat stress or the high temperature of the breathing gas when appropriate. Breathing gas circuits in particular are not optimized for the complex thermal situations encountered in fire fighting situations. These situations are complex, because the thermal circuit needs to be designed differently for the two major scenarios encountered in fire fighting. The first scenario involves operation in elevated ambient temperatures, in which heat will flow into the circuit, making it desirable to have the circuit well insulated to prevent the absorption of heat. The second scenario is entry to and exit from the fire situation, when the ambient temperature is less than that of the breathing gas circuit, making it desirable to have an uninsulated system to allow the heat to flow out of the breathing gas circuit. Because of this conflicting thermal requirement, which is aggravated in the case of closed circuit systems which have the additional heat gain from the canister, existing breathing gas systems are generally not optimized at all or have simplistic insulation schemes.

Existing cooling schemes for high temperature operation generally consist of using ice packs in a chest vest to provide core temperature cooling. Usage of ice pack technology on board Navy ships is undesirable due to the fact that the Navy can not rely on ice being available during combat damage control situations.

SUMMARY OF THE INVENTION

It is thus an object of the present invention to provide a means of chilling breathing gas without the use of ice in elevated temperature systems such as fire fighting or chemical warfare.

It is yet an another object of the present invention to provide a device for chilling breathing gas that is rechargeable thereby making it reusable without the use of electricity or ice.

It is yet another object of the present invention to provide a device for chilling breathing gas that is rechargeable at room temperature.

It is still another object of the present invention to provide a device that may be configured to be universally adaptable to existing available breathing gas devices.

It is further another object of the present invention to provide a device that can be rapidly recharged by refilling it with the phase change material.

It is additionally another object of the present invention to provide a device that can provide heating to a gas stream for extreme cold temperature operation.

It is finally another object of the present invention to provide a device that may utilize ice in lieu of the phase change material in situations where ice is readily available.

The present invention is a heat exchanger mounted in an insulated shell. During use, warm breathing gas enters the unit and flows through the heat exchanger tubes. These tubes are in intimate thermal contact with micro-encapsulated phase change materials. The micro-encapsulated phase change material changes phase from solid to liquid, thereby absorbing heat at the temperature of the phase change material, and thereby cooling the gas flowing through the heat exchanger. In situations where heating of the breathing gas is desired, the gas stream absorbs heat from the phase change material. The unit is rechargeable for chilling applications after usage by placing the device in an ambient environment less than the temperature of the phase change of the material or by replacing the phase change material. It is rechargeable for heating applications by warming the device to a temperature above that of the phase change material. The unit circumvents the need for ice, the most commonly available chilling medium, in situations where ice or other cooling is not available. Additionally, the unit can be used by filling it with an ice water slurry for fire fighting applications where ice is readily available. The gas then exits the device in a chilled state. The device is designed to work in conjunction with numerous existing breathing apparatus by virtue of being able to be placed in-line to existing systems.

BRIEF DESCRIPTION OF THE DRAWINGS

FIG. 1 is a cutaway view of the idealized heat exchanger.

FIG. 2A is a diagram of the heat exchange to the phase change material.

FIG. 2B is a close-up view of the phase change material shown in FIG. 2A.

FIG. 3 is a view of the neck worn configuration of the unit.

DETAILED DESCRIPTION OF THE INVENTION

With reference to FIGS. 1 and 3, there is illustrated the present invention, the breathing gas cooling and heating device 10 of the present invention in which hot breathing gas flows through the adapter inlet port 16 from the low pressure regulator 66 on a breathing rig. The outlet 17 is designed to match the adapter on the face plate of a fire fighting mask 62. The gas flows into the distribution manifold 14 of the heat exchanger shell 12 where it is divided to flow into numerous heat exchanger tubes 18. The shell 12 is fabricated from a high temperature resistant material with high insulation properties. The heat exchanger tubes are surrounded by phase-change material 22. The phase-change materials usable include micro-encapsulated hexadecane, oxadecane, eicosane or docasane, however, other materials found to be acceptable include any material with a high heat density when changing phase. The heat exchanger tubes 18 are made of thin conductive material to maximize heat transfer from the gas into the surrounding phase change material. In a preferred embodiment, the heat exchanger material used was low-conductivity non-toxic polymer. The gas is then cooled (see FIG. 2) in the heat exchanger tubes and passes into the collection manifold 26 and out to a hose 38 which connects the device to the existing regulator port on a fire fighting or chemical suit rig. The assembled heat exchanger shell 12 and heat exchanger tubes 18 is housed in a insulated polymer shell 30 to minimize heat transfer from the outside to the gas. The phase change material is added and removed when exhausted via a fill port or series of fill ports 20 on the shell 12. The design of the heat exchanger is such that the external shell can be formed into many shapes for maximum equipment compatibility and wearer comfort. The exit hose 38 is insulated with a high heat resistance and reflective covering 42 to minimize heat gain to the breath stream.

FIG. 2 shows the heat transfer mechanism for chilling of the gas stream. Warm air 46 flowing in the heat exchanger tubes 18 heats the walls 50 of the tubes. Heat from the walls 50 flows to the phase change material 22 which is cooler than the walls because it is changing phase. The phase change material is heated to the point where it reaches its solid-liquid melting line and remains at that temperature until all the solid material changes phase. During this time, the temperature of the phase change material 22 remains relatively constant. This physical phenomena is analogous the fact that a slurry of ice and water will remain at 32 degrees Fahrenheit until all the ice is melted. Since the material is changing phase, it can absorb a relatively large amount of heat. The phase change material 22 is constructed so that the temperature of the phase change is slightly greater than normal storage temperature. This allows the material to always be in its solid state and have the latent heat of melting available for chilling gas. For the device 10 to work as a warming device, the heat transfer is in effect reversed. The phase change material 22 is liquified by heating to slightly greater than it's phase change, and then the heat of fusion, (the opposite of the latent heat of melting) is available for warming the gas. The phase change material 22 is encapsulated as shown in FIG. 2B with a coating 23 of inert, waterproof, and highly thermally conductive barrier material so that it remains as a powder in either its liquid or solid state. This reduces the flammability and toxicity of the material.

FIG. 3 shows the device formed into a molded horse shoe collar 54 to be worn around the neck of the subject for use with fire fighting equipment that uses a mask 62. For use on other apparatus, the device is configured to be worn under a fire suit on the chest or on the back.

The exit hose 38 and reflective covering 42 are shown connecting the unit to the face plate of the mask 62. The low pressure regulator 66 which delivers gas to the unit is shown plugged into the device instead of the mouthpiece 68 of the mask, where it would be in existing operating circumstance. Note that the heat exchanger shell 12 can be readily reconfigured to suit different types of equipment. Additionally, the device 10 can be used without a breathing regulator for a gas warming or chilling application. The device 10 is recharged either by adding new material via fill port 20 or simply by placing it in ambient condition at a temperature lesser than its phase change temperature for use as a chiller and higher than its phase change temperature for use as a heater. This means the device 10 could be recharged by putting it in a bucket of 70 degree water, which is readily available on even the most combat damaged of ships.

The structure and method disclosed herein illustrate the principles of the present invention. The invention may be embodied in other specific forms without departing from its spirit or essential characteristics. The embodiment of the invention described herein is to be considered in all respects as exemplary and illustrative rather than restrictive. Therefore, the appended claims rather than the foregoing description define the scope of the invention. All modifications to the embodiment described herein that come within the meaning and range of equivalence of the claims are embraced within the scope of the invention.

What we now claim as our invention is:

1. A breathing gas heating and cooling device, comprising:

a flow-through housing having opposite spaced apart inlet and outlet ends;

a plurality of separate flow-through heat exchanger tubes being open at opposite ends and disposed in said flow-through housing in side-by-side spaced apart relation to one other for receiving flowing breathing gas from said inlet end of said flow-through housing and transferring heat between said separate tubes and said gas during transit of said gas therethrough to said outlet end of said flow-through housing, said flow-through heat exchanger tubes being affixed within said flow-through housing;

a phase change means for transferring heat between said separate flow-through heat exchanger tubes and said phase change means, said phase change means disposed about and in contact with each of said separate flow-through heat exchanger tubes and between said separate flow-through tubes and between said tubes and said housing; and a means surrounding said flow-through housing for insulating said flow-through tubes and said flow-through housing from the ambient.

2. The device of claim 1 wherein said phase-change means is encapsulated.

3. The device of claim 2 wherein said phase-change means is micro-encapsulated.

4. The device of claim 3 wherein said phase-change means is a micro-encapsulated material having a high heat density when changing phase.

5. The device of claim 3 wherein said phase change means is a micro-encapsulated compound selected from the group consisting of hexadecane, oxadecane, eicosane and docasane.

6. The device of claim 2 wherein said encapsulated means is rechargeable.

7. The device of claim 2 wherein said encapsulated means is replaceable.

8. A breathing gas heating and cooling device, comprising:

a flow-through heat exchanger shell having two closed ends and having a portion of the enclosed volume of said shell at one end defining a distribution manifold, a portion at the other end defining a collection manifold, and a phase change portion defined between said distribution and collection manifolds, said shell having an inlet port to said distribution manifold, an outlet port to said collection manifold, and a fill port to said phase change portion;

a plurality of separate heat exchanger tubes affixed within said heat exchanger shell within said phase change portion, spaced apart from said shell and from each other laterally and extending between said distribution manifold at said one end of said shell and said collection manifold at said other end of said shell for receiving flowing breathing gas from said distribution manifold and transferring heat between said gas and said separate tubes during transit of said gas through said separate tubes to said collection manifold;

phase change material filling the phase change portion of said heat exchanger shell in the space between said separate tubes and between said tubes and said heat exchanger shell, said material sized to maximize filling the space between and contact with said separate tubes and said heat exchanger shell, and selected for maximum phase change and thereby transferring of heat between said phase change material and said separate tubes; and an insulated shell surrounding said heat exchanger shell and in contact therewith.

9. The device of claim 8 wherein said phase change material is encapsulated.

10. The device of claim 8 wherein said phase change material is rechargeable.

11. The device of claim 8 wherein said phase change material is replaceable.

12. The device of claim 8 wherein said phase change material is micro-encapsulated.

13. The device of claim 8 wherein said phase change material is micro-encapsulated by the coating.

14. The device of claim 12 wherein said phase-change means is a micro-encapsulated material having a high heat density when changing phase.

15. The device of claim 12 wherein said phase-change means is a micro-encapsulated compound selected from the group consisting of hexadecane, oxadecane, eicosane, and docasane.

* * * * *